United States Patent [19]

Stevens

[11] Patent Number: 5,013,077
[45] Date of Patent: May 7, 1991

[54] ADJUSTABLE SPACERS FOR SUPPORTING FRONT WINDOW GLASS IN AN AUTOMOBILE

[75] Inventor: William T. Stevens, Rochester Hills, Mich.

[73] Assignee: Automotive Moulding Company, Warren, Mich.

[21] Appl. No.: 475,473

[22] Filed: Feb. 5, 1990

Related U.S. Application Data

[63] Continuation of Ser. No. 274,083, Nov. 21, 1988, Pat. No. 4,921,297.

[51] Int. Cl.$^5$ .............................................. B60F 1/04
[52] U.S. Cl. .................................................. 296/96.21
[58] Field of Search ................. 296/96.21, 96.22, 97.7; 114/361

[56] References Cited

U.S. PATENT DOCUMENTS 4,249,356  2/1981  Noso ...................................... 52/717
4,750,449  2/1988  Muhlberger ........................ 114/361

Primary Examiner—Andres Kashnikow
Assistant Examiner—Richard Camby
Attorney, Agent, or Firm—Dykema Gossett

[57] ABSTRACT

A method and apparatus is disclosed for mounting a front window glass panel within an automobile vehicle frame. Spacer elements are mounted to the vehicle frame and support the glass panel at a desired position both vertically and laterally. The spacer elements have a vertical support surface and a lateral support, both of which can be integrally adjusted so as to be brought into contact with the window glass panel. A generally H-shaped molding is disposed on the bottom of the front window glass panel and receives the lateral support portion of the spacer element. The width of the lateral support element is less than the width of the opening within this molding so as to provide a clearance between the two that will allow variations in the lateral positioning of the front window glass panel. The spacer element is a one-piece plastic molded item that allows rapid assembly of the front window glass to the vehicle frame.

6 Claims, 2 Drawing Sheets

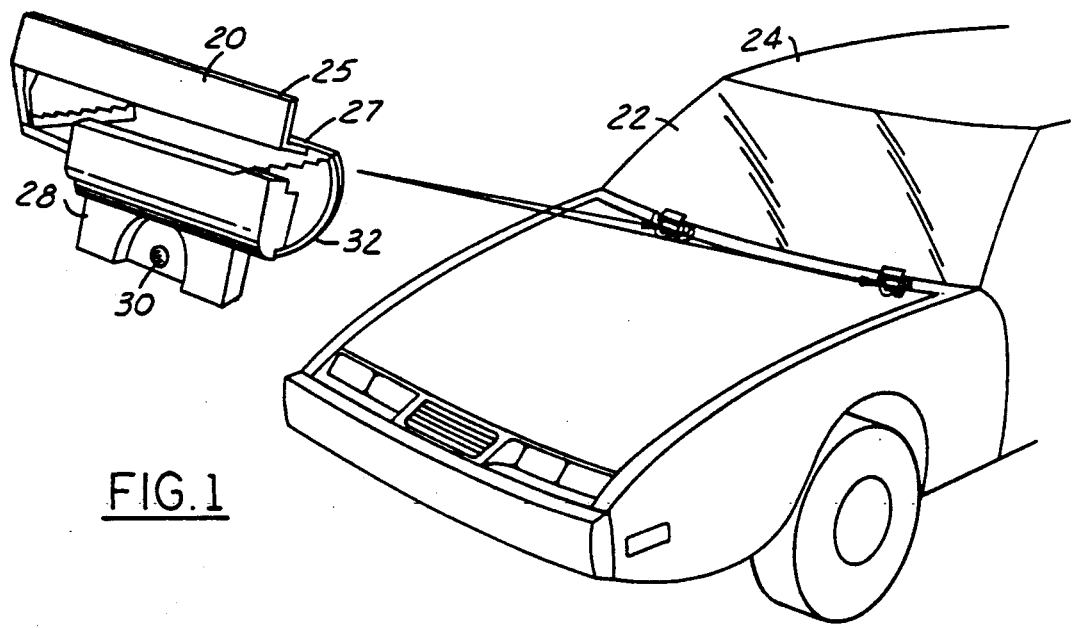
FIG. 1
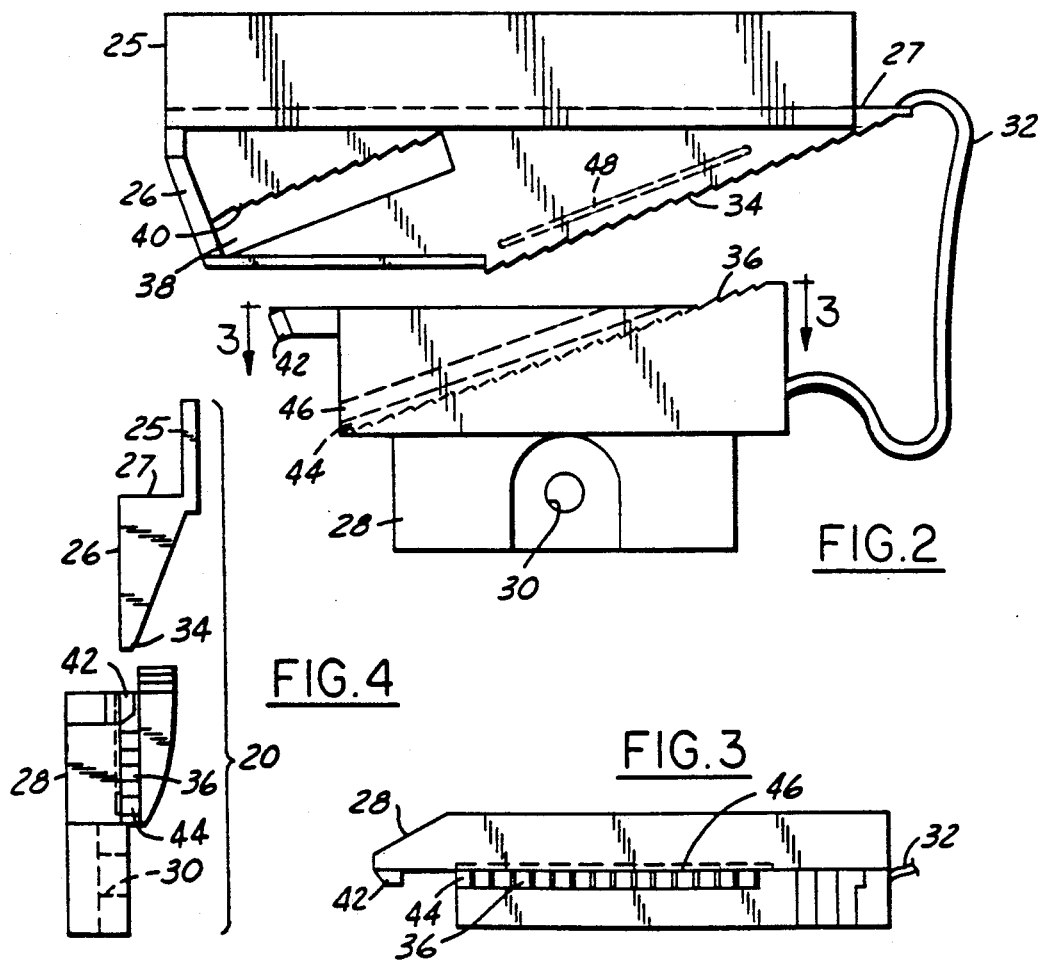
FIG. 2
FIG. 4
FIG. 3

ADJUSTABLE SPACERS FOR SUPPORTING FRONT WINDOW GLASS IN AN AUTOMOBILE

This is a continuation of application Ser. No. 274,083 filed on Nov. 21, 1988, issued as U.S. Pat. No. 4,921,297 on May 1, 1990.

BACKGROUND OF THE INVENTION

Modern automobiles are typically assembled with a sheet of front window glass that is secured to the vehicle frame over a window opening at some time during the assembly of the overall automobile. A caulking or sealant is applied around the perimeter of the frame which defines the opening and upon which the sheet of glass is placed in order to seal it to the automobile frame. Alternatively, the caulking may be applied about the sheet of glass which is then inserted in the frame opening. Typically the front window glass is placed on some form of spacer that acts to hold the glass at a desired position. It is desirable in modern automobile assembly enviroments, that as many of these assembly steps as possible be capable of robotic assembly.

Problems arise with the prior art automobile glass assembly methods due to the manufacturing tolerances encountered with the various members. In the prior art, a spacer member is typically attached to the vehicle frame and the glass is supported on top of the spacer member. It is desirable that an equal gap be formed between the glass and the vehicle frame at all four sides of the perimeter of the window glass since an equal gap ensures that the gap will not be unnecessarily large at any one point. This is often difficult to achieve due to the manufacturing variations within the acceptable tolerances found on the three distinct members that will create the gap between the window glass and the vehicle frame. First the space formed within the vehicle frame that acts to receive the window glass or the window glass itself has its own manufacturing tolerances that may cause it to be relatively larger or smaller than an idealized dimension for which they were designed. In addition, the spacer member may be larger or smaller than the spacer dimension that was used to calculate the desired dimensions of the window glass or vehicle frame space, in addition, the glass could be placed upon the caulking slightly out-of-line, thus creating an overly larger gap. For all of these reasons, a manual assembler would often need to adjust the position of the window glass within the vehicle frame in order to accommodate the various manufacturing tolerances and optimize the position of the glass. In order to equalize the gap, the assembler may have needed to lift the window glass off the spacers. When this happens, the window glass would often settle downwardly back onto the spacers and become too far removed from the top of the vehicle frame, that is there would be an overly large gap between the top of the glass and the vehicle frame. In addition, it is time consuming for a manual assembler to have to accommodate the manufacturing tolerances by moving the window glass around within the opening on the automobile frame.

The present invention relates to an adjustable spacer member for use in supporting the rear window glass in an automobile. This adjustable spacer member allows the surface of the spacer member that supports the window glass to be adjusted upwardly or downwardly in order to accommodate the various manufacturing tolerances that are encountered in any individual automobile. This rear window adjustable spacer was on sale over 1 year prior to the filing date of this application and thus the adjustable rear window spacer is prior art for this application. The details of this prior art rear window spacer will be disclosed with reference to the drawings below.

Problems have arisen with prior art spacers in that they do not provide a lateral support for the window glass. In particular the adjustable prior art spacer did not have any surface that provided a lateral support to the rear window glass panel that it was supporting. This could result in the glass being secured at a lateral position that is either too far out or too far into the vehicle frame.

SUMMARY OF THE INVENTION

The present invention discloses a method and apparatus that allows quick and accurate adjustment of the placement of front window glass within the vehicle frame opening provided for receiving front window glass. In particular, the present invention discloses a spacer element upon which is supported the front window glass. The spacer element has a vertical support surface that can be adjusted upwardly or downwardly to support the window glass at different positions in order to accommodate the various manufacturing tolerances that have been described above. The adjustable spacer member of the present invention also has a lateral support portion that will move integrally with the adjustable vertical support surface of the spacer element. In addition, a molding member is placed upon the bottom of the front window glass and receives the lateral support portion of the adjustable spacer, thus allowing the window glass to be positioned accurately at a desired lateral position.

The spacer element of the present invention comprises a one-piece plastic item that has a bottom piece that is to be riveted to the vehicle frame and a top piece that can be incrementally adjusted within the bottom piece. A thin piece of plastic connects the bottom and top pieces and makes the item easier to handle and assemble. The bottom spacer portion has a channel with incremental teeth that receives complimentary teeth formed on the top portion of the spacer member and which can be slid upon the teeth of the bottom member in order to incrementally adjust the top member which acts as a support for the window glass. The top surface of the top member is adjusted with the top member to adjust the position of the vertical support surface to bring it into contact with the window glass. In addition to this channel and tooth engagement, there is a second channel formed in the top member that receives a guide tooth formed on the bottom member. The second channel in the top member also has teeth and these channel teeth will incrementally advance on the guide tooth formed on the bottom member as the top member is incrementally advanced upon the bottom member. The second tooth and channel arrangement acts in conjuction with the first tooth and channel arrangement to ensure that the two members are parallel with respect to each other and will provide a sturdy support for the window glass. In addition to these two engagements, there is a tongue and groove arrangement that acts to provide further lateral support between the top and bottom members and also acts to help guide the top member upon the fixed bottom member. A lateral support surface extends upwardly perpendicular from one side of the top vertical support surface of the top member. This lateral support portion moves integrally with the entire top portion and will act to accurately position the window glass at a selected lateral position within the vehicle frame.

The window glass itself is provided with a molding along at least its bottom surface. This molding is generally H-shaped and receives the window glass into one of the internal halves of the H-shape. The lateral support portion of the adjustable spacer member is received within the other half of the H-shape and acts to accurately align the window glass within the vehicle frame. The entire window glass and molding assembly rests upon the top vertical support surface of the top portion of the adjustable spacer member.

The method of assembly disclosed by the present invention involves first pop-riveting the spacer member to the rear window space formed on the vehicle frame of an automobile and attaching the top portion of the spacer within the channel of the bottom portion of the spacer. It is to be understood that there will be a right and left spacer mounted to the vehicle frame in order to provide support for the window glass at both sides of the automobile. Either prior to, or immediately after the spacers are attached, caulking is placed on the frame around the window opening. The generally H-shape molding is next snapped onto the window glass and the window glass is placed upon the caulking. An operator can then incrementally adjust the top spacer member within the bottom spacer member in order to advance the top surface of the top portion upwardly until it abuts the window glass and has the lateral support surface received in the H-shape molding that has been snapped onto the glass. The adjustable spacer member thus supports the front window glass both vertically and laterally.

It is a feature of the present invention to provide an adjustable spacer member that is formed with a lateral support surface that can move with the adjustable support surface of the spacer member.

It is a further feature of the present invention to provide an adjustable spacer member that will securely position the window glass at a desired lateral position.

It is also a feature of the present invention to achieve these goals in an adjustable spacer member that is sturdy and requires relatively few parts.

These and other features of the present invention can be best understood upon a consideration of the following specification and drawings in which the following is a brief description thereof.

BRIEF DESCRIPTION OF THE DRAWINGS

FIG. 1 is a perspective view showing the placement of the spacers of the present invention within the overall vehicle frame of an automobile.

FIG. 2 is a side view showing the basic structure of the one-piece spacer for mounting window glass disclosed by the present invention.

FIG. 3 is a top view looking downwardly into the bottom portion of the spacer element of the present invention along lines 3—3 as shown in FIG. 2.

FIG. 4 is a front view showing the alignment of the top and bottom portions of the spacer element of the present invention.

DETAILED DESCRIPTION OF THE PREFERRED EMBODIMENT

Figure 5:
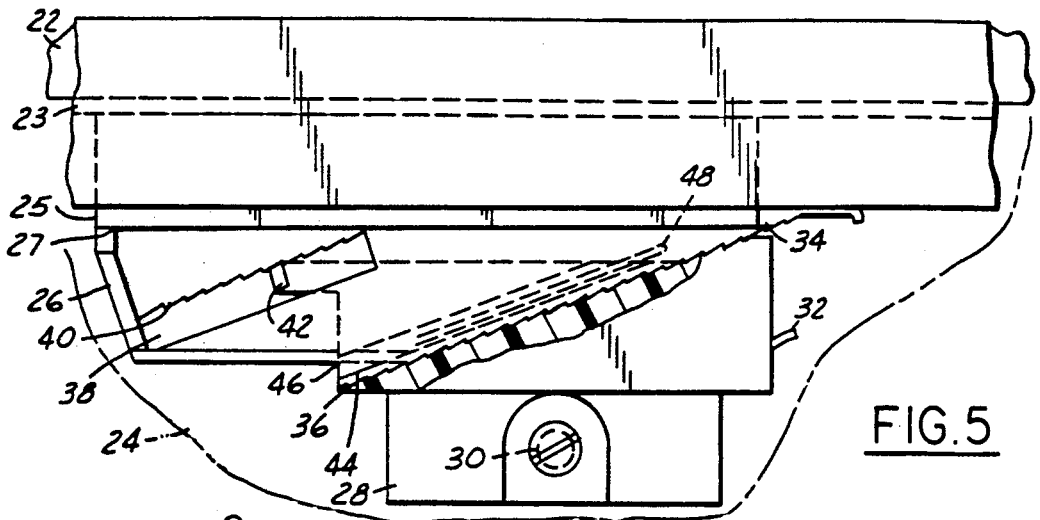
FIG. 5 is a side view showing the spacer element mounted upon a vehicle frame and supporting a window glass.

The general environment to which the present invention is concerned can best be understood from FIG. 1. As shown in FIG. 1, spacer elements 20 are placed supporting a front window glass panel 22 at the left and right portion of the window glass 22 and mounted upon the vehicle frame 24 of an automobile. A molding 23, FIG. 5-8, is mounted to the bottom of the window glass panel 22.

Spacer element 20 of the present invention has many elements that are similar to a rear window support spacer element that is part of the prior art; the similar elements will now be described. Top portion 26 has a vertical support surface 27 upon which the vehicle glass 22 is provided with vertical support. The bottom portion 28 is shown having a rivet hole 30 and a tie portion 32 connects the top and bottom portions 26, 28. Teeth portions 34 formed near the rear of the top portion 26 are incrementally arranged along an angle transverse to the axis of the vertical support surface 27. Complimentary teeth portions 36 are formed on the bottom portion 28 and are also transverse to the surface 27 upon which the vehicle glass will be mounted. Preferably both teeth portions form an angle of 37 degrees with respect to the axis of the support surface 27. A channel 38 is formed within the front of the top portion 26 of the spacer element 20 and has channel teeth 40 that also incrementally advance transverse to the surface 27. The channel 38 is adpated to receive a guide tooth element 42 formed on the bottom portion 28 and which is adapted so as to engage the incremental channel teeth 40 formed within the channel 38. It is to be understood that the top portion 26 is generally received within a channel 44 formed within the bottom portion 28 of the spacer element 20 of the present invention, and at the same time the guide tooth member 42 formed on the bottom portion is received within the channel 38 formed on the top portion. The channel 38 formed on the top portion extends throughout the entire lateral extent of the top portion 26. The top portion is firmly received within the bottom portion due to the engagement of the teeth 34 and 36 and the engagement of the guide tooth 42 with the incremental channel teeth 40. Further support is given to the connection between the two members by channel 46 that is formed extending laterally inwardly from the channel 44 formed in the lower portion 28 and a tongue 48 formed on the top portion slightly above the tooth portion 34. The top portion 26 is thus firmly received within the body portion 28 at three connection surfaces. These three connection surfaces serve to firmly guide the top member as it moved incrementally along the bottom member and at the same time ensure that the two members are constrained to be parallel with respect to each other.

The structure of the bottom portion 28 of the present invention, that is, similar to the prior art rear window spacer can be best understood from FIG. 3, which shows a view looking downwardly into the bottom portion. As can be seen, the bottom portion 28 has the channel 44, the groove 46 formed inwardly from the channel 44, teeth 36 and guide tooth 42.

The features described in the above two paragraphs were also possessed by a prior art spacer that was used to mount rear window glass panels in an automobile. The spacer of the present invention differs from the prior art spacer in that it is provided with a lateral support portion 25 extending upwardly perpendicular from the support surface 27. In addition, the spacer of the present invention 20 is being used to support the front window glass of an automobile rather than the rear window glass.

The alignment of the two members prior to insertion of the top portion 26 within the bottom portion 28 can be understood from FIG. 4. An assembler aligns the portion of the top member formed with the teeth 34 with the channel 44 and push the top portion downwardly into the channel 44 thus engaging the teeth 34 with the teeth 36. At the same time, guide tooth 42 will snap into the channel 38. The engagment of the top portion 26 within the bottom portion 28 ensures that the vertical support surface 27 and the lateral support 25 will be properly aligned so as to ensure that the window glass 22 will be supported at the desired position.

FIG. 5 illustrates the spacer element 20 of the present invention in its assembled position. As can be seen, a molding 23 has been mounted to the bottom of the window glass 22, and it rests upon the vertical support surface 27 of the spacer element 20. The lateral support 25 is received within a portion of the molding 23 and acts to position the window glass 22 at the proper lateral position. The bottom portion of the spacer element 20 has been riveted at 30 to the vehicle frame 24. Thus, the spacer element 20 provides a support to position the window glass 22 upon the vehicle frame 24 in both the vertical and lateral directions. The details of the connection of the top portion 26 upon the bottom portion 28 can also be seen. As is shown in FIG. 5, guide tooth 42 is received within the channel 38 and is engaged upon incremental channel teeth 40 formed upon the top portion. In addition, the engagement of teeth 34 of the top portion can be seen upon teeth 36 formed on the channel 44 within the bottom portion 28. The tongue and groove guiding connection 46, 48 formed between the top 26 and bottom 28 portions can also be seen in FIG. 5. A first distance can be defined as the distance from the rivet hole to 30 to the support surface 27 along the line drawn perpendicular to the support surface 27. This first distance will given an indication of where the glass 22 is supported with respect to the vehicle frame 24. As can also be seen, the lateral support 25 is received within the molding 23 and will act to laterally restrain the window glass 22.

Figure 6:
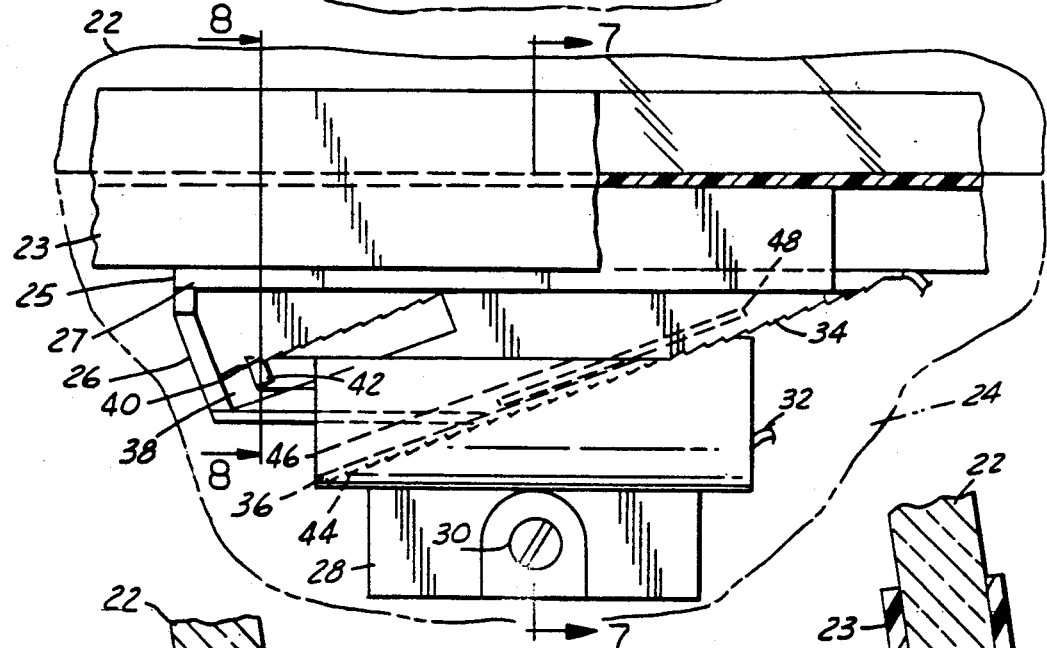
FIG. 6 is a view similar to FIG. 5, however, showing the spacer of the present invention having been adjusted upwardly with respect to the position shown in FIG. 5.

FIG. 6 shows the same assembly as FIG. 5 after the spacer element 20 has been adjusted slightly upwardly. As can be seen, the guide tooth 42 now rests on a channel tooth 40 formed within the channel 38 much further down along the channel 38. In addition, the teeth 34 and tongue 48 are illustrated much higher up within the channel 44 of the bottom portion 28. The first distance, defined above, would be greater at the position shown in FIG. 6 than it was in the position shown in FIG. 5. Thus, the window glass 22 would be supported further upwardly as shown in FIG. 6. It can be seen that the molding 23 remains resting on the support surface 27 and that lateral support 25 is still received within the molding 23, thus the window glass 22 is still supported both vertically and laterally in position shown in FIG. 6.

Figure 7:
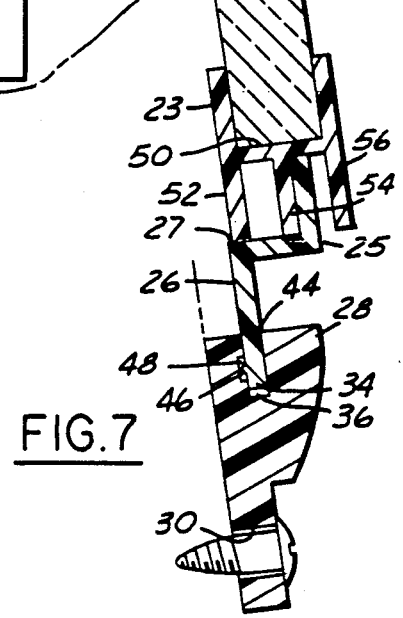
FIG. 7 is a cross-section to the spacer of the present invention as shown in FIG. 6 along lines 7—7.

FIG. 7 shows details of how the spacer element 20 supports the window glass 22. As can be seen, a molding 23 is generally H-shaped and the window glass 22 is received within an opening 50 that forms one-half, or the top of the H-shaped portion of the molding 23. The other half of the H-shaped molding 23 is comprised of three downwardly extending flanges 52, 54, 56 which act to receive the lateral support 25 formed on the top member 26. As can be seen from the drawing, the lateral support 25 is received between the flanges 54, 56 and thus laterally supports and restrains the window glass 22 at a proper position within the vehicle frame 24. As is shown in the drawings, there may be a clearance between the support portion 25 and the opening between the flanges 54, 56. This clearance will allow slight variation in the lateral position of the window glass 22 if the position need not be extremely accurately maintained. The presence of this clearance allows the top portion 26 to be adjusted upwardly without requiring an operator to move the window glass 22 and its associated molding 23 into a lateral position where the lateral support 25 would be aligned with an opening in the molding 23. Due to the presence of the clearance between the lateral support 25 and the opening between the flanges 54 and 56 the top portion 26 can be moved upwardly into a position where the support surface 27 supports the molding 23 vertically and the lateral support 25 is received within the molding 23 even if the window glass 22 and its associated molding 23 are slightly out of position in a lateral direction. The presence of the second opening between the flanges 52 and 54 would further allow some tolerance in the positioning of the window glass 22. That is, the window glass 22 and its associated molding 23 may be out of position laterally to such an extent that the lateral support 25 is actually aligned with the opening between the member 52, 54 and thus will be received in that opening. If it is not harmful for the lateral position of the window glass 22 to be varied to that extend, the operator can simply move the top portion 26 upwardly and insert the lateral support 25 into that opening. The presence of the middle flange 54 provides an assembly in which the window glass and molding 23 need not be extremely accurately positioned due to the presence of the two openings, but will result in a final assembly that is not a sloppy fit. That is, without the middle flange 54 the lateral support 25 could be positioned anywhere between the flanges 52 and 56 thus giving the ability to vary the position of the window glass 22 to that extent. However, with this arrangement, the lateral support 25 would also have a very large clearance from any support surface on the molding 23. This could result in a fit that is too loose to be acceptable. With the inclusion of the flange 54, the present invention allows the lateral variation between the flanges 52 and 56 but at the same time ensures that in the final assembly the lateral support 25 will not be so loosely received within the molding 23 that the clearance will be equal to the entire distance between the flange 52 and 54. The support surface on the flange 54 results in a less sloppy fit. In the final assembly, the caulking will fill in the clearance between the lateral support and the molding flanges. The clearance and support are important until the caulking or sealant hardens.

As is also shown in FIG. 7, the spacer element 20 has been riveted 30 to the vehicle frame and the tongue 48 is received within the groove 46. It is to be understood that this tongue and groove connection 46, 48 is seen as a third contact surface and will provide accurate guiding and firm support for the top portion 26 as it moves along the bottom portion 28 in order to adjust the position of the glass 22.

Figure 8:
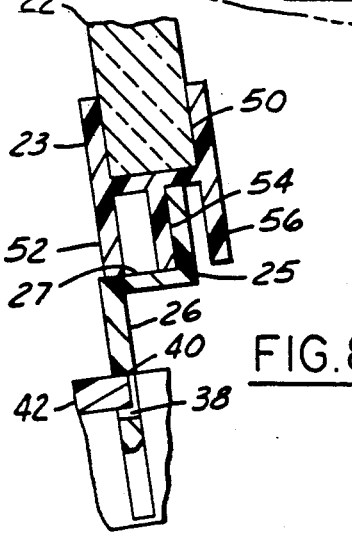
FIG. 8 is a cross-section to the spacer element of the present invention as shown in FIG. 6 along lines 8—8.

FIG. 8 shows the engagement of the guide tooth 42 within the channel 38 formed on the top portion 26. It is to be understood that the importance of this second distinct contact surface is to ensure that the top portion 26 will always remain parallel to the bottom portion 28 and will also provide a very firm support for the window glass 22 upon support surface 27.

The method of assembling a front window glass within the front window frame opening of an automobile will now be described with reference to the drawings, particularly FIGS. 5 and 6. In assembling the front window glass 22 to the vehicle frame 24, a molding 23 is snapped upon the bottom portion of the window glass 22. The bottom portion 28 of the spacer element 20 is riveted to the vehicle frame 24. Some means are necessary to ensure that the bottom portion 28 is riveted parallel to a desired plane, any one of several means well known in the art will be sufficient for this purpose. The top portion 26 of a spacer element 20 of the present invention is of course tied to the bottom portion 28 by the tie 32 and thus is easily accessible for positioning within the channel 44 formed within the bottom portion 28. The tie 32 also assists the assembler in locating the necessary parts, he only need grab a single part. The next step in assembling the front window glass 22 is to snap the top portion 26 within the channel 44 of the bottom portion 28 and at the same time snap guide tooth 42 into the channel 38 formed within the top portion 26. It is to be understood that by snapping the top portion 26 into the channel 44 the tongue 48 will also be positioned within the groove 46 and thus all three contact surfaces between the two members will be established. Caulking is placed on the window opening in the frame either prior to or immediately after this spacer 20 is attachment step. The next step in the assembly is to position the window glass 22 and molding 23 upon the caulking that has been placed around the window opening. Alternatively, the caulking can be placed around the window glass 22 and the caulked window can then be placed upon the vehicle frame. Once this has been done, the assembler can slide the top portion 26 upon the bottom portion 28 in order to move it into contact with the window glass 22 so that the surface 27 abuts the molding 23 and acts to vertically support the window glass 22 within the vehicle frame 24. As this top portion 26 is moved upwardly into contact with the molding 23, the lateral support 25 will also be received within an opening in the molding 23, either between the flanges 52 and 54 or the flanges 54 and 56.

Teeth 34 will incrementally advance along the teeth 36 while at the same time the channel teeth 40 will incrementally advance upon the guide teeth 42 in order to move the top portion 26 relative to the bottom portion 28. Once the window glass 22 is fixed to the vehicle frame 24, spacer elements 20 will remain beneath the window glass 22 and will provide support for the window glass 22 and aid it in remaining in the position within the vehicle frame 24 to which it has been fixed.

Since it may be desired to position the front window glass 22 skew with respect to a vertical axis, it is important that the lateral support surface 25 be adjustable along with the vertical support surface 27. As is shown in the various drawings, particularly FIGS. 7 and 8, the window glass 22 is skew with respect to a true vertical line. Since the support surface 27 is to be adjusted vertically in order to abut the molding 23 it is important that the lateral support 25 also be adjusted so that the skew angle of the glass panel 22 will be met by the angle of the lateral support 25. A stationary lateral support will not provide the same benefits as this adjustable lateral support since the window glass 22 may be positioned at any one of several positions due to manufacturing tolerances and a stationary lateral support would not be at the proper angle to accommodate these different positions. The lateral support 25 of the present invention will move along with the adjustable top portion 26 and will provide a lateral support surface that will accommodate the different positions of the window glass 22 and will be properly aligned on the desired skew angle.

The spacer element of the present invention is preferably made from a lightweight sturdy material, a synthetic material such as a copolymer nylon that is heat stabilized for injection molding is most desirable.

A working embodiment of the spacer element that acts to accurately position a window glass within the front window vehicle frame opening has been disclosed, however, certain modifications will be considered as well within the ability of a worker in the art. Several modifications of the three-surface contact between top and bottom portions are seen as being within the scope of the invention disclosed, for instance two or four surface contact would be seen as part of the present invention. There may be no clearance between the lateral support and the molding, or the lateral support may be adjusted separately from the vertical support. Also, an attachment means other than rivets would be within the intended scope of the present invention. The intended scope of the present invention can be best understood upon a review of the appended claims.

What is claimed is:

1. A spacer element for mounting a front window glass panel within a vehicle frame comprising:
   a bottom portion;
   a top portion;
   said bottom portion being formed with means to receive said top portion and allow said top portion to be incrementally advanced along said bottom portion;
   said bottom portion being formed with a rivet opening that will allow said bottom portion to be riveted to a vehicle frame;
   said top portion being formed with a support surface that will act to vertically support a window glass panel and a lateral support portion that will act to laterally support a window glass panel;
   said top portion being received within said bottom portion at any one of several distinct incremental positions, a first distance being defined as the distance from the rivet hole to said support surface formed on said top portion, said distance being measured along a line extending perpendicular to said support surface; and
   the incremental advancement of the top portion within the bottom portion causing lateral translation of said top portion relative to said bottom portion and allowing the adjustment of said first distance and the vertical adjustment of said lateral support portion in order to accommodate manufacturing tolerances between the spacer element or the vehicle frame or the window glass.

2. A spacer element as recited in claim 1 and further wherein said lateral support extends integrally upwardly from said support surface.

3. A spacer element as recited in claim 2 and further wherein said lateral support extends perpendicularly upwardly from said support surface.

4. A spacer element as recited in claim 2 wherein said top portion and said bottom portion are provided with engageable teeth which permits the top portion including said support surface to be incrementally adjusted with respect to said bottom portion.

5. A spacer element as recited in claim 4 and a tie portion connecting said top and bottom portions.

6. A spacer element as recited in claim 1, and further wherein said lateral support portion extending upwardly from one lateral end of said support surface.

* * * * *